(12) United States Patent
Qin (10) Patent No.: US 9,574,531 B2
(45) Date of Patent: Feb. 21, 2017

(54) CAMSHAFT FOR HP COMMON RAIL OIL PUMP, MANUFACTURING METHOD THEREOF AND INTERFERENCE ASSEMBLY DEVICE THEREOF

(75) Inventor: Zuan Qin, Sichuan (CN)

(73) Assignee: Mianyang Brilliance Ruian Automotive Components Co., Ltd., Sichuan (CN)

( * ) Notice: Subject to any disclaimer, the term of this patent is extended or adjusted under 35 U.S.C. 154(b) by 173 days.

(21) Appl. No.: 14/380,519

(22) PCT Filed: Jul. 12, 2012

(86) PCT No.: PCT/CN2012/078534
§ 371 (c)(1),
(2), (4) Date: Aug. 22, 2014

(87) PCT Pub. No.: WO2013/127143
PCT Pub. Date: Sep. 6, 2013

(65) Prior Publication Data
US 2015/0053044 A1    Feb. 26, 2015

(30) Foreign Application Priority Data
Feb. 28, 2012    (CN) .......................... 2012 1 0048602

(51) Int. Cl.
*B23P 15/00*    (2006.01)
*F01L 1/047*    (2006.01)
(Continued)

(52) U.S. Cl.
CPC ............. *F02M 39/02* (2013.01); *B23P 11/025* (2013.01); *B23P 15/00* (2013.01); *B23P 19/02* (2013.01);
(Continued)

(58) Field of Classification Search
CPC ...... F02M 39/02; F02M 59/102; F02M 59/48; F04B 9/042; F04B 53/006; F04B 1/0413; C21D 1/10; C21D 1/18; C21D 9/30; Y02P 10/253; Y10T 29/53439; Y10T 74/2101; Y10T 29/49293; B23P 2700/02; B23P 15/00; B23P 19/02; B23P 11/025; B21D 53/845; B22F 7/062; B22F 7/08; F01D 5/025; F01L 1/047; F16C 3/06; F16D 1/06; F16H 53/025
See application file for complete search history.

(56) References Cited

U.S. PATENT DOCUMENTS 4,057,609 A * 11/1977 Uhlig ................. B29C 49/062
264/328.11
4,604,510 A    8/1986 Laughlin et al.
(Continued)

FOREIGN PATENT DOCUMENTS

CN    101509062    8/2009
CN    102528381    7/2012
(Continued)

OTHER PUBLICATIONS

"Assembled Hollow Camshaft Trial-Manufacture", Master Thesis of Jilin University, Oct. 31, 2008.
(Continued)

*Primary Examiner* — David Bryant
*Assistant Examiner* — Jun Yoo
(74) *Attorney, Agent, or Firm* — Caesar Rivise, PC (57) ABSTRACT

An exemplary camshaft for a high pressure common rail oil pump and a manufacturing method thereof is provided. The method achieves interference assembly between the mandrel and cam piece, and satisfies anti-rotating torque of the cam piece relative to the mandrel while ensuring the surface hardness of the cam piece. The camshaft includes a mandrel (Continued)

and a cam piece arranged on the mandrel. The anti-rotating torque of the cam piece relative to the mandrel is at least 500 NM after the cam piece and the mandrel are connected by interference fit by hot charge practice. Surface hardness of the cam piece 1 is at least HRC58. The method includes performing interference assembly of the cam piece and the mandrel while performing quenching heat treatment on the cam piece, then quickly cooling the cam piece equipped with the mandrel at the cooling stage during the quenching heat treatment.

8 Claims, 5 Drawing Sheets

(51) Int. Cl.
| | |
|---|---|
| *F02M 39/02* | (2006.01) |
| *C21D 9/30* | (2006.01) |
| *C21D 1/18* | (2006.01) |
| *C21D 1/10* | (2006.01) |
| *F04B 1/04* | (2006.01) |
| *F04B 9/04* | (2006.01) |
| *F04B 53/00* | (2006.01) |
| *B23P 11/02* | (2006.01) |
| *B23P 19/02* | (2006.01) |
| *F02M 59/48* | (2006.01) |
| *F02M 59/10* | (2006.01) |

(52) U.S. Cl.
CPC . *C21D 1/10* (2013.01); *C21D 1/18* (2013.01); *C21D 9/30* (2013.01); *F02M 59/48* (2013.01); *F04B 1/0413* (2013.01); *F04B 9/042* (2013.01); *F04B 53/006* (2013.01); *B23P 2700/02* (2013.01); *F02M 59/102* (2013.01); *Y02P 10/253* (2015.11); *Y10T 29/49293* (2015.01); *Y10T 29/53439* (2015.01); *Y10T 74/2101* (2015.01)

(56) References Cited

U.S. PATENT DOCUMENTS

| | | | | |
|---|---|---|---|---|
| 4,616,389 | A | * | 10/1986 | Slee ................ B23P 11/025 29/447 |
| 6,000,368 | A | * | 12/1999 | Mikame ............ F01L 1/047 123/90.18 |
| 2014/0245582 | A1 | * | 9/2014 | Kim ................ B23P 11/00 29/240 |

FOREIGN PATENT DOCUMENTS

| | | |
|---|---|---|
| CN | 102536561 | 7/2012 |
| DE | 102010038679 | 2/2012 |
| JP | 2010 | 8/1999 |
| JP | 2002028827 | 1/2002 |

OTHER PUBLICATIONS

International Search Report for corresponding PCT Application No. PCT/CN2012/078534 dated Dec. 13, 2012.

\* cited by examiner

CAMSHAFT FOR HP COMMON RAIL OIL PUMP, MANUFACTURING METHOD THEREOF AND INTERFERENCE ASSEMBLY DEVICE THEREOF

CROSS-REFERENCE TO RELATED APPLICATIONS

This national stage application claims the benefit under 35 U.S.C. §371 of International Application No. PCT/CN2012/0078534 filed on Jul. 12, 2012, entitled CAMSHAFT FOR HIGH-PRESSURE COMMON-RAIL OIL PUMP, MANUFACTURING METHOD THEREOF AND INTERFERENCE ASSEMBLY EQUIPMENT THEREOF, whose entire disclosures are incorporated by reference herein.

FIELD OF THE INVENTION

The invention relates to camshaft and manufacturing thereof, in particular to a camshaft for a high-pressure common rail oil pump, a manufacturing method thereof and an interference assembly device thereof.

DESCRIPTION OF THE RELATED ART

As the load born by a camshaft in an HP common rail oil pump is far higher than that born by a common camshaft, all camshafts for HP common rail oil pumps produced in China and abroad are of one-piece structure, that is, a mandrel and a cam piece are machined together on a same blank. The one-piece structure of the camshaft results in great machining difficulty and high cost. For this reason, the applicant of the invention considers replacing the one-piece structure with a combined structure, that is, the mandrel and the cam piece are machined separately and then assembled together. However, practices reveal that an assembled camshaft meeting technical requirements cannot be manufactured by the conventional process if a camshaft for a HP common rail oil pump is designed as an assembled structure. The problems lie in interference assembly of the cam piece and the mandrel as well as heat treatment of the cam piece.

Known methods for achieving interference assembly of an enveloping part and an enveloped part in the art include plunging method, hot charge practice, cold charge practice and oil pressure method. As the load born by a camshaft for an HP common rail oil pump is large, the interference between a mandrel and a cam piece is required to be large (up to about 0.1 mm), but interference assembly of the mandrel and the cam piece of the camshaft for the HP common rail oil pump cannot be achieved by the plunging method, cold charge practice and oil pressure method. As a result, the hot charge practice is the only interference assembly method suitable for the camshaft for the HP common rail oil pump, which causes heating problem of the cam piece during hot charge.

The most critical procedures of the interference assembly process by the hot charge practice were control of heating temperature and heat treatment timing of parts. Based on the contents recorded in Page 1548 of "Mechanical Part Manual: Type Selection/Design/Guidelines, edited by Yu Mengsheng and Wu Zongze, China Machine Press, June 1996", the heating temperature of an enveloping part without heat treatment shall be less than 400° C., while that of an enveloping part undergoing heat treatment shall be less than tempering temperature. That is, the current hot charge practice separates heat treatment and interference assembly of enveloping parts, i.e. an enveloping part undergoes heat treatment and then is assembled with an enveloped part, or the enveloping part is assembled with the enveloped part and then undergoes heat treatment.

For the camshaft for an HP common rail oil pump of the invention, as the surface hardness of the cam piece is required to be very high, the cam piece must undergo quenching heat treatment. Practices reveal that if the cam piece is interference assembled to the mandrel by the hot charge practice and then undergoes quenching heat treatment, the fit between the mandrel and the cam piece will become loose due to deformation of the cam piece resulting from heat treatment, and the anti-rotating torque of the cam piece relative to the mandrel can reach 200 to 300 NM only, which cannot meet use requirements. However, if the cam piece undergoes quenching heat treatment and then is interference assembled to the mandrel by the hot charge practice, the heating temperature of the cam piece is required to be high due to large interference between the cam piece and the mandrel. In addition, the tempering temperature of the cam piece is about 160° C. in general, and the heating temperature of the cam piece during hot charge will be far higher than the tempering temperature thereof, which is equivalent to a normalizing treatment of the cam piece, thus reducing the surface hardness of the cam piece to approximately HRC30, so that the use requirement for the camshaft for the HP common rail oil pump cannot be met.

As a result, the assembled camshaft for the HP common rail oil pump manufactured by the prior art cannot meet the requirements that the anti-rotating torque between the cam piece and the mandrel connected through interference fit is apparently higher than 300 NM and the surface hardness of the cam piece is far more than HRC30.

SUMMARY OF THE INVENTION

The first technical problem to be solved by the invention is to provide a camshaft for an HP common rail oil pump, and a mandrel and a cam piece of the camshaft interference assembled can satisfy the anti-rotating torque of the cam piece relative to the mandrel and ensure the surface hardness of the cam piece. The second technical problem to be solved by the invention is to provide a manufacturing method of a camshaft for an HP common rail oil pump, and the method can help interference assembly of the mandrel and the cam piece, satisfy the anti-rotating torque of the cam piece relative to the mandrel and ensure the surface hardness of the cam piece. The third technical problem to be solved by the invention is to provide an interference assembly device of a camshaft for an HP common rail oil pump and by the method. The fourth technical problem to be solved by the invention is to provide an interference assembly method for an enveloping part and an enveloped part, and the method satisfies high anti-rotating torque between the enveloping part and the enveloped part after interference assembly by hot charge practice, and ensures the surface hardness of the cam piece. The fifth technical problem to be solved by the invention is to provide an interference assembly device of an enveloping part and an enveloped part.

The camshaft for an HP common rail oil pump provided by the invention for solving the first technical problem comprises a mandrel and a cam piece arranged on the mandrel, anti-rotating torque of the cam piece relative to the mandrel is not less than 500 NM after the cam piece and the mandrel are connected by interference fit, and surface hardness of the cam piece is not less than HRC58. The applicant holds that the camshaft for an HP common rail oil pump is different from the existing camshaft for an HP common rail oil pump. The technical feature that anti-rotating torque of the cam piece relative to the mandrel is not less than 500 NM characterizes the fit relationship between the cam piece and the mandrel after hot charge, while the technical feature that surface hardness of the cam piece is not less than HRC58 characterizes the material performance of the cam piece after hot charge. These technical features cause the camshaft of the application to be substantially different from the existing camshaft for an HP common rail oil pump, but the differences come from the creative thinking and practice of the inventor of the application, and corresponding instruction or teaching cannot be found in the prior art.

For the camshaft for an HP common rail oil pump, when the anti-rotating torque of the cam piece relative to the mandrel is not less than 500 NM, the camshaft can meet the requirement for use in the HP common rail oil pump, based on which, the anti-rotating torque of the cam piece relative to the mandrel is preferably not less than 3000 NM after the cam piece and the mandrel are connected through interference fit by hot charge practice, thus further improving the service performance of the camshaft.

The manufacturing method of a camshaft for an HP common rail oil pump provided by the application for solving the second technical problem comprises the following steps: performing interference assembly of the cam piece and the mandrel while performing quenching heat treatment on the cam piece, that is, installing the mandrel into the heat expanded cam piece at the heating stage during the quenching heat treatment, then quickly cooling the cam piece equipped with the mandrel at the cooling stage during the quenching heat treatment, thus obtaining an assembled camshaft. The innovative point of the method lies in simultaneous implementation of the quenching heat treatment of the cam piece and interference assembly between the cam piece and the mandrel, i.e. the cam piece is heated to tempering temperature, and the mandrel and the cam piece are assembled during heating, and then the cam piece is cooled quickly, thus interference assembling the cam piece to the mandrel while completing quenching of the cam piece. The method avoids the sequence problem of hot charge and quenching, thus the fit between the mandrel and the cam piece will not become loose as hot charge is prior to quenching, and the surface hardness of the cam piece will also not drop as quenching is prior to hot charge.

Tests show that a camshaft for an HP common rail oil pump with anti-rotating torque of a cam piece relative to a mandrel being not less than 500 NM and surface hardness of the cam piece being not less than HRC58 can be directly obtained by the method. It should be underlined here that the prior art cannot provide a camshaft for an HP common rail oil pump with anti-rotating torque of the cam piece relative to the mandrel being not less than 500 NM and surface hardness of the cam piece being not less than HRC58 by interference assembly of the cam piece and the mandrel, thus the camshaft is a new product, and the manufacturing method of the camshaft for an HP common rail oil pump of the application is the manufacturing method of a new product.

As a further improvement of the method, the cam piece can be preassembled to a tooling mandrel, and the tooling mandrel is axially and detachably butt-jointed with the mandrel to form a mandrel assembly. During quenching heating, the mandrel assembly moves axially relative to the cam piece until the cam piece moves to the preset position on the mandrel, and the tooling mandrel is removed. In the improvement measure, a tooling mandrel is used as an auxiliary tool. The benefit from use of the tooling mandrel is pre-positioning of the cam piece, so that the cam piece and the mandrel are assembled, and the assembly precision is ensured. Based on the improvement measure, the mandrel assembly is preferably in a vertical position and falls by gravity when the cam piece is heat expanded, thus avoiding manual or mechanical realization of the axial relative movement between the mandrel assembly and the cam piece.

The tooling mandrel and the mandrel can be axially and detachably butt-jointed by multiple means. For example, the tooling mandrel and the mandrel are directly connected by pins, or the tooling mandrel and the connection end of the mandrel are subject to a little interference connection. The specific means in the application are as follows: an axial through hole is arranged in the tooling mandrel, a threaded hole corresponding to the axial through hole is arranged on an end face of the mandrel, and the tooling mandrel is detachably butt-jointed with the mandrel by a screw arranged in the axial through hole and connected with the threaded hole. Preferably, one end of the tooling mandrel is provided with a positioning groove to match the mandrel ends with the positioning groove, so that the position precision between the tooling mandrel and the mandrel can be improved.

The interference assembly device of a camshaft for an HP common rail oil pump provided by the application for solving the third technical problem comprises a frame, the frame is provided with a cam piece positioning unit, a cam piece quenching heating unit, a cam piece quenching cooling unit and a mandrel positioning unit respectively, and relative position between the cam piece positioning unit and the mandrel positioning unit is set based on the design positions of the cam piece and the mandrel. The device is used as follows: firstly, placing the cam piece on the cam positioning unit so that the cam piece is defined by the cam piece positioning unit; heating the cam piece by the cam piece quenching heating unit, and installing the mandrel in the heat expanded cam piece at the heating stage during quenching heat treatment by means of relative movement between the cam piece and the mandrel; defining the mandrel by the mandrel positioning unit when the cam piece and the mandrel move relatively to the design positions of the cam piece and the mandrel; and quickly cooling the cam piece by the cam piece quenching cooling unit to finish quenching of the cam piece and assembly of the camshaft.

Based on the stated reasons, the cam piece positioning unit and the mandrel positioning unit are preferably designed such that the mandrel falls by gravity relative to the cam piece and is finally defined by the mandrel positioning unit when the cam piece is heat expanded. In addition, the frame is provided with a mandrel guiding unit which can guide the mandrel during assembly of the cam piece and the mandrel, so that accuracy of the relative movement between the cam piece and the mandrel can be guaranteed.

The interference assembly method for an enveloping part and an enveloped part provided by the application for solving the fourth technical problem is as follows: performing interference assembly of the enveloping part and the enveloped part while performing quenching heat treatment on the enveloping part, namely installing the enveloped part in the heat expanded enveloping part at the heating stage during quenching heat treatment, then quickly cooling the enveloped part equipped with the enveloped part at the cooling stage during the quenching heat treatment, thus completing assembly.

When the enveloped part is a shaft part, the enveloping part can be preassembled to a tooling mandrel, and the tooling mandrel is axially and detachably butt-jointed with the enveloped part to form a mandrel assembly. During quenching heating, the mandrel assembly moves axially relative to the enveloping part until the enveloping part moves to the preset position on the enveloped part, and the tooling mandrel is removed. Preferably, when the enveloping part is heat expanded, the mandrel assembly is in a vertical position so that the mandrel assembly falls by gravity.

The tooling mandrel is provided with an axial through hole, an end face of the enveloped part is provided with a threaded hole corresponding to the axial through hole, and the tooling mandrel is detachably butt-jointed with the enveloped part through a screw arranged in the axial through hole and connected with the threaded hole. Preferably, one end of the tooling mandrel is provided with a positioning groove to match the ends of the enveloped part with the positioning groove.

The interference assembly device of an enveloping part and an enveloped part provided by the application for solving the fifth technical problem comprises a frame, the frame is provided with an enveloping part positioning unit, an enveloping part quenching heating unit, an enveloping part quenching cooling unit and an enveloped part positioning unit, and relative position between the enveloping part positioning unit and the enveloped part positioning unit is set based on the design positions of the enveloping part and the enveloped part.

The enveloping part positioning unit and the enveloped part positioning unit are preferably designed such that the enveloped part falls by gravity relative to the enveloping part and is finally defined by the enveloped part positioning unit when the enveloping part is heat expanded. In addition, the frame is provided with an enveloped part guiding unit which can guide the enveloped part during assembly of the enveloping part and the enveloped part, so that the accuracy of the relative movement between the enveloping part and the enveloped part can be guaranteed.

Obviously, the interference assembly method for an enveloping part and an enveloped part as well as the interference assembly device of an enveloping part and an enveloped part are summarized from the camshaft for an HP common rail oil pump, a manufacturing method thereof and an interference assembly device thereof in the application. Obviously, it easily occurs to those skilled in the art that the enveloping part and enveloped part can cover two parts such as gear and gear shaft with multiple hub interference fit connection relations in the machinery field.

The application will be further described in combination with accompanying drawings and preferred embodiments. Some additional aspects and advantages of the application will be described below, and these additional aspects and advantages become apparent from the description below or learned through practices of the invention.

DESCRIPTION OF THE PREFERRED EMBODIMENT

Figure 6:
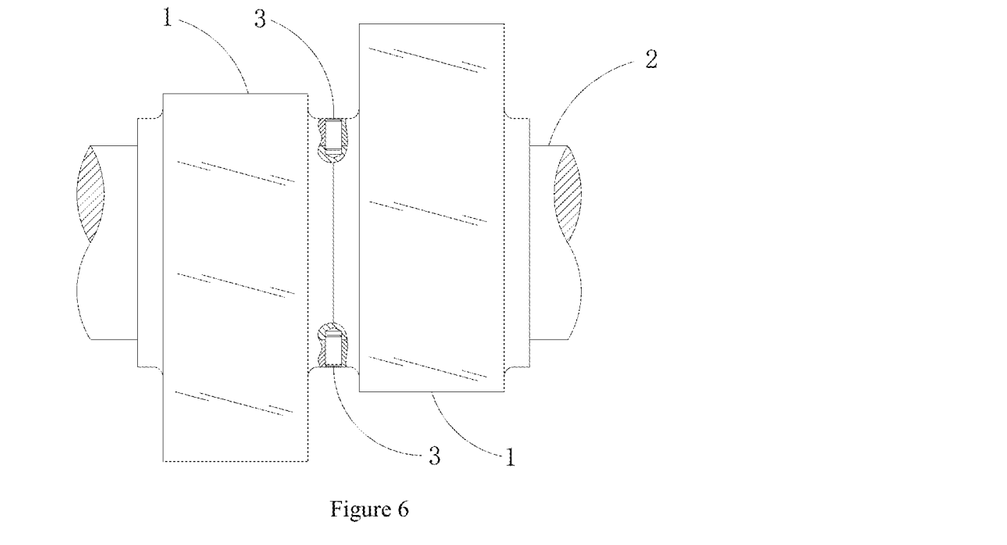
FIG. 6 is a structural diagram of a camshaft for an HP common rail oil pump in the application.

First, the manufacturing method of a camshaft for an HP common rail oil pump is described in detail. As shown in FIG. 6, a camshaft for an HP common rail oil pump comprises a mandrel 2 and a cam piece 1 arranged on the mandrel 2, the mandrel 2 and the cam piece 1 are separately manufactured, and the mandrel 2 and the cam piece 1 are manufactured by the prior art; after the mandrel 2 and the cam piece 1 are manufactured, the mandrel 2 may be subject to heat treatment to allow material performance thereof to reach the design requirements; as surface hardness of the cam piece 1 is required to be very high, the cam piece 1 must be also subject to quenching heat treatment; the cam piece 1 is heat expanded and inner bore diameter thereof increases at the heating stage during the quenching heat treatment of the cam piece 1, the mandrel 2 is installed in the cam piece 1 immediately, relative position between the cam piece 1 and the mandrel 2 is kept during assembly; after heat preservation for a period of time, the cam piece 1 is quickly cooled by a cooling medium (cooling media comprise water, oil, air, etc.) to obtain an assembled camshaft. After quenching, the cam piece 1 can be subject to tempering treatment to reduce internal stress of the material. Before quenching heat treatment, the cam piece 1 can be subject to carburizing, nitriding or carbonitriding treatment to further increase the surface hardness thereof. The innovative point of the method is avoiding the sequence problem of hot charge and quenching; thus, the fit between the mandrel 2 and the cam piece 1 will not become loose as hot charge is prior to quenching, and surface hardness of the cam piece will not reduce as quenching is prior to hot charge.

As shown in FIG. 6, after interference assembly of the mandrel 2 and the cam piece 1 are completed, a pin 3 can be inserted between the mandrel 2 and a hub of the cam piece 1. When the mandrel 2 is provided with at least two cam pieces 1, the pin 3 is preferably arranged between two adjacent cam pieces 1. The pin 3 can accurately position the cam piece 1 and increase axial and circumferential load of the cam piece 1.

Figure 1:
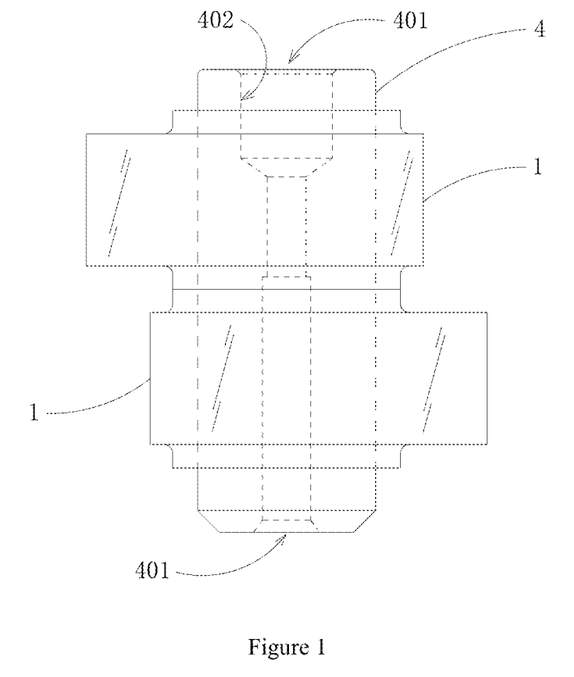
FIG. 1 is an assembly diagram of a tooling mandrel and a cam piece in the application.
Figure 2:
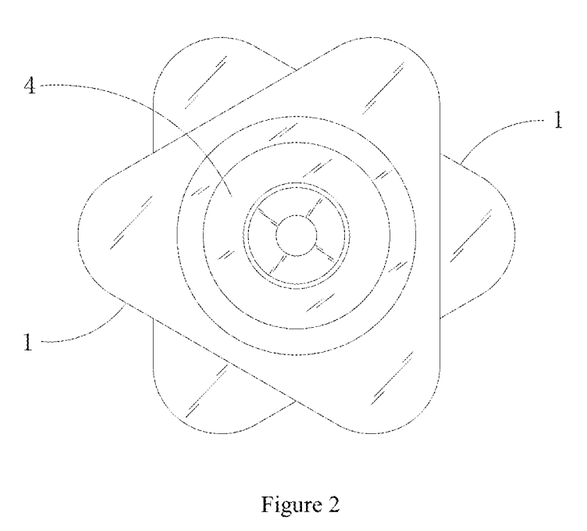
FIG. 2 is a top view of FIG. 1.
Figure 3:
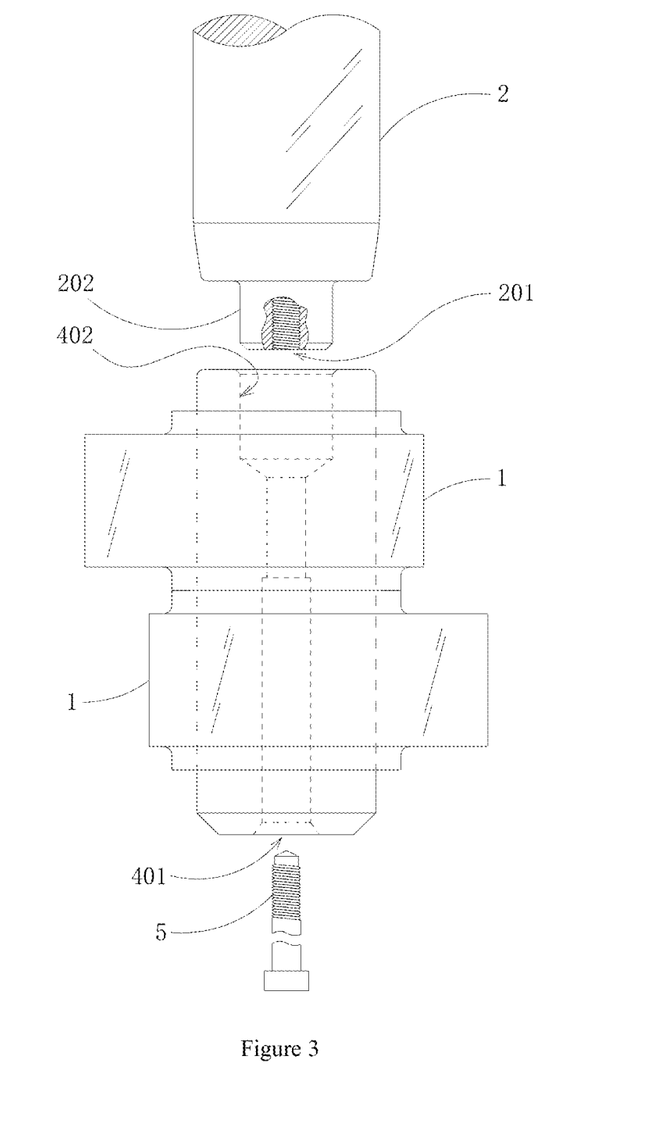
FIG. 3 is a schematic diagram of butt-joining a tooling mandrel equipped with a cam piece with a mandrel in the application.

As another innovative point of the application, in order to ensure the assembly accuracy of the cam piece 1 during implementation of the method, as shown in FIG. 1, a tooling mandrel 4 is also used during the implementation of the method, and the tooling mandrel 4 and the cam piece 1 are in light interference so that the cam piece 1 can be assembled to the tooling mandrel 4 through common press fitting and offset between the cam piece 1 and the tooling mandrel 4 will not occur easily. During installation, relative position between the cam piece 1 and the tooling mandrel 4 should be guaranteed; especially circumferential position between the cam piece 1 and the tooling mandrel 4. That is, as shown in FIG. 2, relative angle between the cam pieces 1 should be guaranteed when at least two cam pieces 1 are provided, and axial position between the cam piece 1 and the tooling mandrel 4 should be guaranteed. As shown in FIG. 1, the tooling mandrel 4 is provided with an axial through hole 401, one end of the axial through hole 401 is provided with a positioning groove 402, and a stepped hole is arranged between the other end of the axial through hole 401 and the positioning groove 402. As shown in FIG. 3, one end of the mandrel 2 is provided with a shaft neck 202 adaptable to the positioning groove 402, and an end face of the shaft neck 202 is provided with a threaded hole 201 corresponding to the axial through hole 401. The tooling mandrel 4 is detachably butt-jointed with the mandrel 2 by a screw 5 arranged in the axial through hole 401 and connected with the threaded hole 201. The tooling mandrel 4 is axially and detachably butt-jointed with the mandrel 2 by the screw 5 to form a mandrel assembly. When quenching heating is performed on the cam piece 1, the cam piece 1 can move to the preset position on the mandrel 2 by simply axially moving the mandrel assembly relative to the cam piece 1. Finally, the tooling mandrel 4 is removed to complete the assembly of the camshaft. When the cam piece 1 is installed on the tooling mandrel 4, the cam piece 1 has been accurately positioned. Therefore, relative position between the cam piece 1 and the mandrel 2 can be ensured as long as the movement distance of the mandrel assembly is controlled when the mandrel assembly moves axially relative to the cam piece 1.

Figure 4:
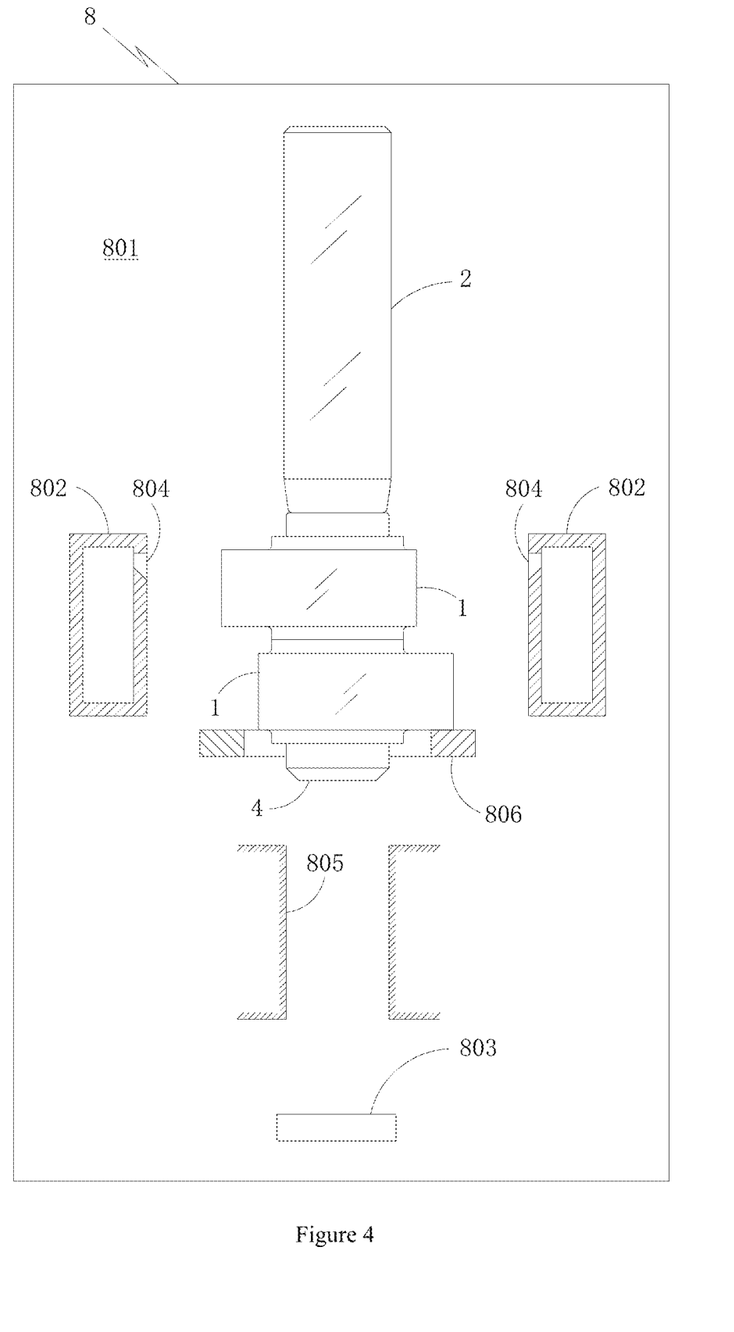
FIG. 4 is a structural diagram of an interference assembly device (before interference assembly) in the application.
Figure 5:
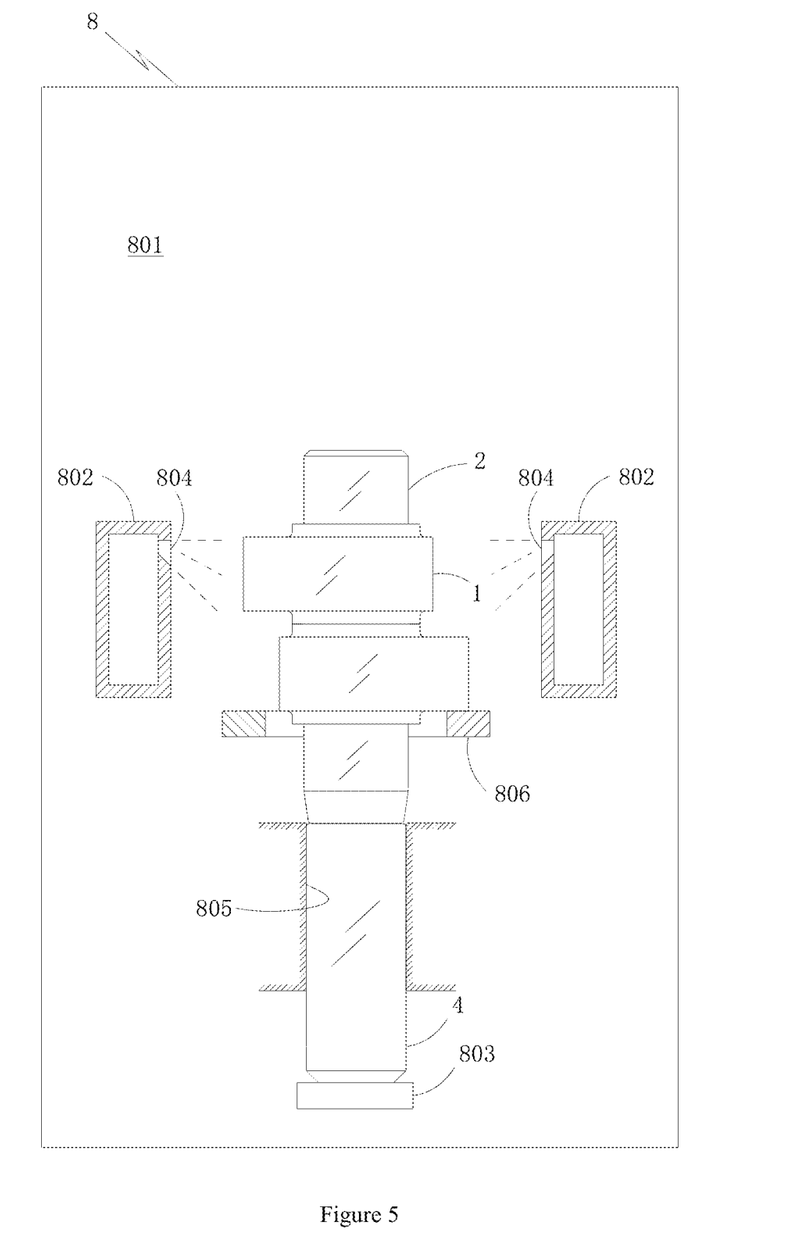
FIG. 5 is a structural diagram of an interference assembly device (after interference assembly) in the application.

In order to implement the method better, the application provides an interference assembly device. As shown in FIGS. 4 to 5, the interference assembly device comprises a frame 801, the frame 801 is provided with a cam piece positioning unit, a cam piece quenching heating unit, a cam piece quenching cooling unit and a mandrel positioning unit respectively, and relative position between the cam piece positioning unit and the mandrel positioning unit is set based on design positions of the cam piece 1 and the mandrel 2. Preferably, the frame 801 is provided with a mandrel guiding unit which can guide the mandrel 2 during the assembly of the cam piece 1 and the mandrel 2. Specifically, as shown in FIG. 4, when the tooling mandrel 4 equipped with the cam piece 1 is axially butt-jointed with the mandrel 2, the tooling mandrel 4 is placed on the frame 801 by the cam piece positioning unit, the cam piece positioning unit comprises a support block 806 located at the bottom of the cam piece 1 to allow the tooling mandrel 4 and the mandrel 2 to be in vertical positions. The cam piece quenching heating unit comprises an inductor 802 which is an annular hollow copper tube. After the cam piece 1 is placed on the support block 806, the cam piece 1 is just in the inductor 802. The cam piece quenching cooling unit comprises nozzles 804 which are toward the cam piece 1 and continuously arranged on inner wall of the inductor 802 in the circumferential direction and communicated with an inner cavity of the hollow copper tube. The mandrel positioning unit comprises a stop block 803 arranged below the support block 806, and the stop block 803 and the support block 806 have certain height difference. The mandrel guiding unit comprises a guider 805 arranged between the stop block 803 and the support block 806. The structure of the inductor 802 and the nozzle 804 is prior art and has been widely applied to various induction quenching coils.

As shown in FIG. 4, the cam piece 1 is quickly heated after the inductor 802 starts, and the mandrel assembly starts to fall when inner bore of the cam piece 1 expands. As shown in FIG. 5, when a lower end of the tooling mandrel 4 contacts the stop block 803, the cam piece 1 is just assembled at the set position of the mandrel 2. After heat preservation for a period of time, the cam piece 1 is cooled immediately, i.e. the cam piece 1 is sprayed for cooling through the nozzles 804; afterwards, the tooling mandrel 4 is removed to complete the assembly.

EXAMPLES AND COMPARATIVE EXAMPLES

Comparative Example 1

First, a mandrel and a cam piece were manufactured, then the mandrel was quenched and tempered, and the cam piece was carburized, the case depth on the surface of the cam piece was 1.2 mm, and the magnitude of interference of the mandrel and the cam piece measured before assembly was 0.12 mm; then the cam piece was quickly heated to 400° C. by an inductor, the mandrel was installed in the heat expanded cam piece, and hot charge of the mandrel and the cam piece was completed after natural cooling; and the cam piece was quenched after hot charge, inductively heated to 900° C. during quenching, kept for 5 seconds, sprayed to cool for 25 seconds, and heated to 160° C. for tempering after quenching. The anti-rotating torque of the cam piece relative to the mandrel and surface hardness of the cam piece measured after tempering are shown in Table 1.

Comparative Example 2

First, a mandrel and a cam piece were manufactured, then the mandrel was quenched and tempered, and the cam piece was carburized, the case depth on the surface of the cam piece was 1.1 mm, and the measured magnitude of interference of the mandrel and the cam piece was 0.11 mm; then the cam piece was quenched, inductively heated to 860° C. during quenching, kept for 3 seconds, sprayed to cool for 20 seconds, and heated to 160° C. for tempering after quenching; and the mandrel and the cam piece were hot charged, the cam piece was quickly heated to 500° C. by an inductor, the mandrel was installed in the heat expanded cam piece, and hot charge of the mandrel and the cam piece was completed after natural cooling. The measured anti-rotating torque of the cam piece relative to the mandrel and surface hardness of the cam piece are shown in Table 1.

Example 1

First, a mandrel and a cam piece were manufactured, then the mandrel was quenched and tempered, and the cam piece was carburized, the case depth on the surface of the cam piece was 1.15 mm, and the measured magnitude of interference of the mandrel and the cam piece was 0.1 mm; then the cam piece was inductively heated to 900° C., hot charge of the mandrel and the cam piece was completed in the process, then the cam piece was kept for 5 seconds, sprayed to cool for 25 seconds, and heated to 160° C. for tempering after quenching. The measured anti-rotating torque of the cam piece relative to the mandrel and surface hardness of the cam piece are shown in Table 1.

Example 2

First, a mandrel and a cam piece were manufactured, then the mandrel was quenched and tempered, and the cam piece was carburized, the depth of the carburized layer on the surface of the cam piece was 1.2 mm, and the measured magnitude of interference of the mandrel and the cam piece was 0.12 mm; then the cam piece was inductively heated to 920° C., hot charge of the mandrel and the cam piece was completed in the process, then the cam piece was kept for 5 seconds, sprayed to cool for 25 seconds, and heated to 160° C. for tempering after quenching. The measured anti-rotating torque of the cam piece relative to the mandrel and surface hardness of the cam piece are shown in Table 1.

Example 3

First, a mandrel and a cam piece were manufactured, then the mandrel was quenched and tempered, and the cam piece was carburized, the case depth on the surface of the cam piece was 1.0 mm, and the measured magnitude of interference of the mandrel and the cam piece was 0.09 mm; then the cam piece was inductively heated to 860° C., hot charge of the mandrel and the cam piece was completed in the process, then the cam piece was kept for 3 seconds, sprayed to cool for 20 seconds, and heated to 160° C. for tempering after quenching. The measured anti-rotating torque of the cam piece relative to the mandrel and surface hardness of the cam piece are shown in Table 1.

TABLE 1

| No. | Anti-rotating torque of the cam piece relative to the mandrel (NM) | Surface hardness of the cam piece (HRC) |
| --- | --- | --- |
| Comparative example 1 | 213 | 59 |
| Comparative example 2 | 4852 | 32 |
| Example 1 | 6147 | 60 |
| Example 2 | 6220 | 61 |
| Example 3 | 5911 | 60 |

Figure 7:
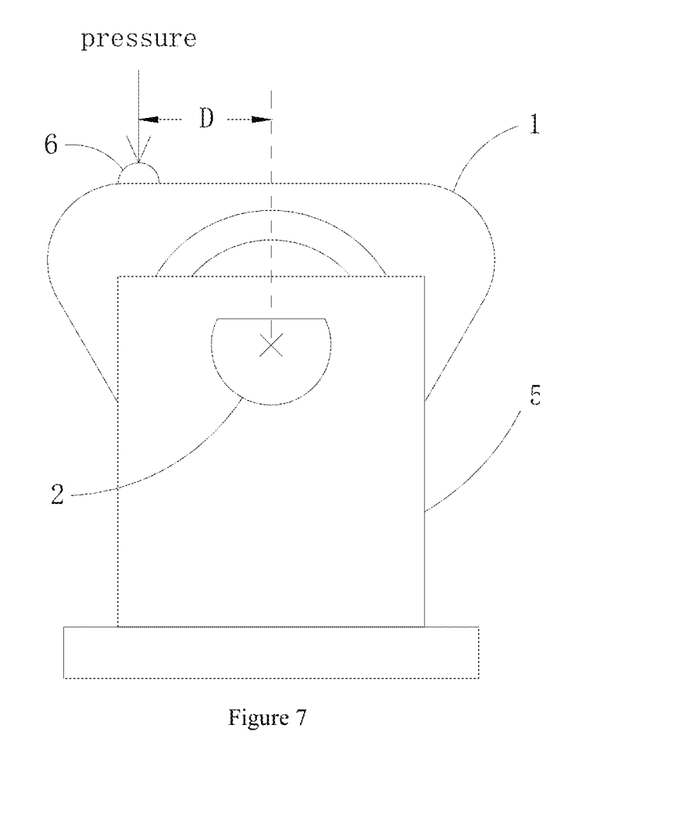
FIG. 7 is a schematic diagram for testing anti-rotating torque of a cam piece relative to a mandrel in the application.

The following means are used for testing the anti-rotating torque of the cam piece relative to the mandrel uniformly in the application:

As shown in FIG. 7, a circular boss 6 is welded close to a nose bit on one side of the cam piece 1, then the distance D between the apex point of the boss 6 and the center of the mandrel 2 is measured, and part of cylindrical surface of the mandrel 2 is cut to be adapted to a hole on a mounting base 5, thus the mandrel 2 is circumferentially fixed by the mounting base 5 after being placed on the mounting base 5. At this time, the mounting base 5 equipped with the camshaft is placed on a press to press the boss 6 by the press, and pressure applied by the boss 6 to the press can be seen from a feedback interface of the press. When the cam piece 1 rotates relative to the mandrel 2, the pressure drops sharply, so peak pressure before sharp drop can be obtained, and the anti-rotating torque of the cam piece relative to the mandrel can be calculated by multiplying the peak pressure by the distance D.

The invention claimed is:

1. A manufacturing method of a camshaft for an HP common rail oil pump, comprising:
performing interference assembly of a cam piece and a mandrel while performing quenching heat treatment on the cam piece by installing the mandrel in the heat expanded cam piece at the heating stage during quenching heat treatment, then quickly cooling the cam piece equipped with the mandrel at the cooling stage during the quenching heat treatment to obtain an assembled camshaft; the process further comprising the steps of:
preassembling the cam piece on a tooling mandrel;
axially and detachably butt-jointing the tooling mandrel with the mandrel to form a mandrel assembly;
axially moving the mandrel assembly relative to the cam piece during quenching heating until the cam piece moves to a preset position on the mandrel; and
removing the tooling mandrel;
wherein the mandrel assembly is in a vertical position and the mandrel assembly falls by gravity when the cam piece is heat expanded.

2. The manufacturing method of a camshaft for an HP common rail oil pump according to claim 1, wherein the tooling mandrel is internally provided with an axial through hole, a threaded hole corresponding to the axial through hole is arranged on an end face of the mandrel, and the tooling mandrel and the mandrel are in detachable butt joint by a screw arranged in the axial through hole and connected with the threaded hole.

3. The manufacturing method of a camshaft for an HP common rail oil pump according to claim 1, wherein one end of the tooling mandrel is provided with a positioning groove, and ends of the mandrel are adapted to the positioning groove.

4. The manufacturing method of a camshaft for an HP common rail oil pump according to claim 1, wherein the cam piece is heated to 860-920° C. and then sprayed to cool for 20-25 seconds during the quenching heat treatment.

5. The manufacturing method of a camshaft for an HP common rail oil pump, comprising:
performing interference assembly of a cam piece and a mandrel while performing quenching heat treatment on the cam piece by installing the mandrel in the heat expanded cam piece at the heating stage during quenching heat treatment, then quickly cooling the cam piece equipped with the mandrel at the cooling stage during the quenching heat treatment to obtain an assembled camshaft; the process further comprising the steps of:
preassembling the cam piece on a tooling mandrel;
axially and detachably butt-jointing the tooling mandrel with the mandrel to form a mandrel assembly;
axially moving the mandrel assembly relative to the cam piece during quenching heating until the cam piece moves to a preset position on the mandrel; and
removing the tooling mandrel;
wherein the tooling mandrel is internally provided with an axial through hole, a threaded hole corresponding to the axial through hole is arranged on an end face of the mandrel, and the tooling mandrel and the mandrel are in detachable butt joint by a screw arranged in the axial through hole and connected with the threaded hole.

6. The manufacturing method of a camshaft for an HP common rail oil pump according to claim 5, wherein one end of the tooling mandrel is provided with a positioning groove, and ends of the mandrel are adapted to the positioning groove.

7. The manufacturing method of a camshaft for an HP common rail oil pump according to claim 5, wherein the cam piece is heated to 860-920° C. and then sprayed to cool for 20-25 seconds during the quenching heat treatment.

8. The manufacturing method of a camshaft for an HP common rail oil pump according to claim 6, wherein the mandrel assembly is in a vertical position and the mandrel assembly falls by gravity when the cam piece is heat expanded.

* * * * *